UNITED STATES PATENT OFFICE.

KUSTAA KOIVISTO, OF PORTLAND, OREGON.

PAINT COMPOSITION.

1,347,387.   Specification of Letters Patent.   Patented July 20, 1920.

No Drawing.   Application filed March 28, 1919.   Serial No. 285,899.

*To all whom it may concern:*

Be it known that I, KUSTAA KOIVISTO, a subject of Finland, residing at Portland, in the county of Multnomah and State of Oregon, have invented new and useful Improvements in Paint Composition, of which the following is a specification.

This invention relates to a painting composition for walls and the like and the object of the invention is the production of a paint which can be manufactured to sell at low cost, one which will dry very quickly and keep its color and one which may be applied by an unskilled person. My composition consists of a mixture of copper sulfate, alum, rye flour, a suitable coloring matter, linseed oil or fish oil and either pine tar or rock salt.

In preparing the paint I prefer to use the ingredients in about the following proportions:—viz., twelve pounds of copper sulfate and twelve pounds of alum are mixed in twenty-eight gallons of boiling water. Then mix thirty-eight pounds of rye flour with ten gallons of water, stirring thoroughly to avoid lumps. This mixture is then mixed with the first mentioned mixture while the same is boiling. The two mixtures are then boiled for about ten or fifteen minutes. After the mixture has boiled a sufficient length of time and while still hot one hundred and twenty-five to one hundred and fifty pounds of dry coloring matter is added and thoroughly stirred thereinto. Then take two gallons of pine tar and warm the same and then mix therewith ten gallons of linseed oil, preferably boiled or fifteen gallons of fish oil. This mixture of tar and oil is thoroughly stirred and then said mixture is mixed with the other materials while still hot and then the entire mixture is thoroughly stirred for about five minutes. The paint is then ready for use though I prefer to strain it before using.

When a substantially white paint is desired the tar and the coloring matter are omitted and seven pounds of rock salt is used in place of the tar. It is preferable to mix the salt with the copper sulfate and alum. This mixture is not snow white but is more of a silver white.

My paint is very cheap, not injurious to health, dries very quickly, keeps its color for a long time, can be painted on cold surfaces, can be painted by anybody (does not require painters), one coat is sufficient, does not take dirt for it dries quickly, not affected by wind while being used, can be painted on damp surface, does not show overlaps, penetrates more than ordinary paint, does not peel off, no blisters, does not run, can be manufactured any place (at one's home), easily cleaned from brushes, and does not injure wood.

What I claim is:—

1. A paint composition comprising a mixture of copper sulfate, alum, rye flour, coloring matter, pine tar and linseed oil mixed with water.

2. A paint composition comprising a mixture of twelve pounds of copper sulfate and twelve pounds of alum, thirty-eight pounds of rye flour, one hundred and twenty-five to one hundred and fifty pounds of dry coloring matter, two gallons of pine tar and ten gallons of linseed oil.

In testimony whereof I affix my signature.

KUSTAA KOIVISTO.